United States Patent [19]

Briggs et al.

[11] Patent Number: 4,890,867
[45] Date of Patent: Jan. 2, 1990

[54] INTEGRAL FERRULE

[75] Inventors: Kerry D. Briggs, South Berwick, Me.; Hadfield, Donald A., Hampton, N.H.

[73] Assignee: Simplex Wire & Cable, Portsmouth, N.H.

[21] Appl. No.: 131,748

[22] Filed: Dec. 11, 1987

[51] Int. Cl.$^4$ .............................................. F16L 33/20
[52] U.S. Cl. ................................. 285/256; 285/382.2; 285/422
[58] Field of Search ............... 285/256, 259, 322, 323, 285/362.2, 422, 245, 246, 247, 248, 249, 255, 343

[56] References Cited

U.S. PATENT DOCUMENTS

| | | | |
|---|---|---|---|
| 2,031,825 | 2/1936 | Eastman | 285/259 X |
| 3,222,091 | 12/1965 | Marshall | 285/255 X |
| 3,375,026 | 3/1968 | Szohatzky | 285/322 |
| 3,429,593 | 2/1969 | Scoblom | 285/247 |
| 3,895,832 | 7/1975 | Ellis et al. | 285/322 |
| 4,585,225 | 4/1986 | Ridenour | 285/322 X |
| 4,634,153 | 1/1987 | Kishton | 265/322 X |

FOREIGN PATENT DOCUMENTS

| | | | |
|---|---|---|---|
| 1146672 | 11/1957 | France | 285/248 |
| 818250 | 8/1959 | United Kingdom | 285/322 |
| 940412 | 10/1959 | United Kingdom | 285/240 |
| 1352445 | 5/1974 | United Kingdom | 285/343 |

Primary Examiner—Dave W. Arola
Attorney, Agent, or Firm—Austin R. Miller

[57] ABSTRACT

A coupling combination comprising a ferrule ring having a portion outwardly of the outer surface of said pipe and having an integral deformable ferrule arm extending longitudinally therefrom adjacent to the outer surface of the pipe, the ring being placed over the pipe such that the ring surrounds an end portion thereof; a cam ring also located outwardly of the outer surface of the pipe and longitudinally placed from the deformable ferrule arm, and having a curved surface arranged to deform the ferrule arm into the pipe upon longitudinal movement of the cam ring against the ferrule; and a plurality of bolts passing through a portion of the cam ring and into the ferrule ring for affecting such longitudinal movement.

6 Claims, 1 Drawing Sheet

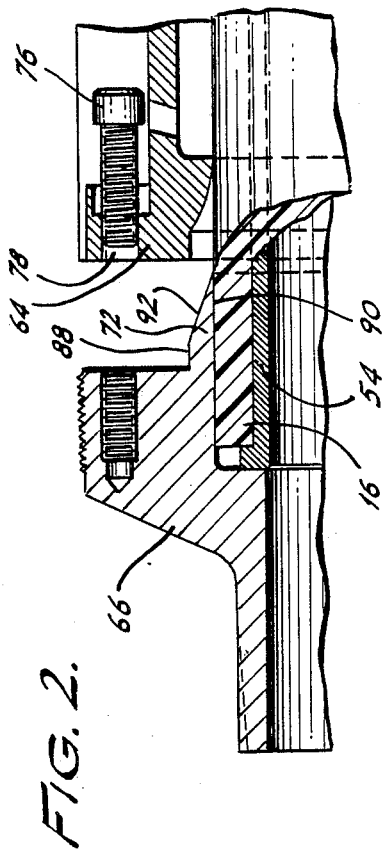
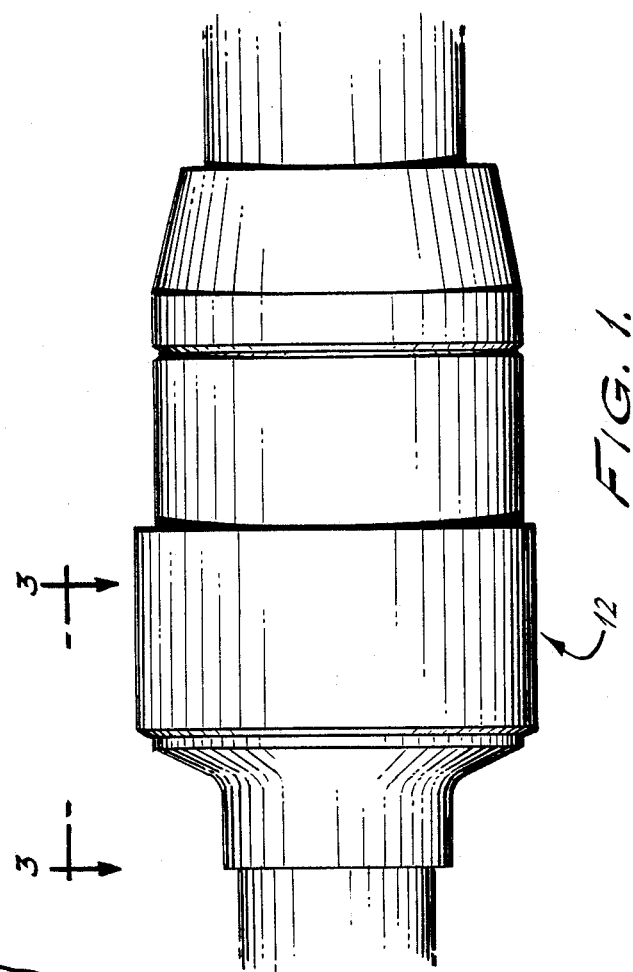
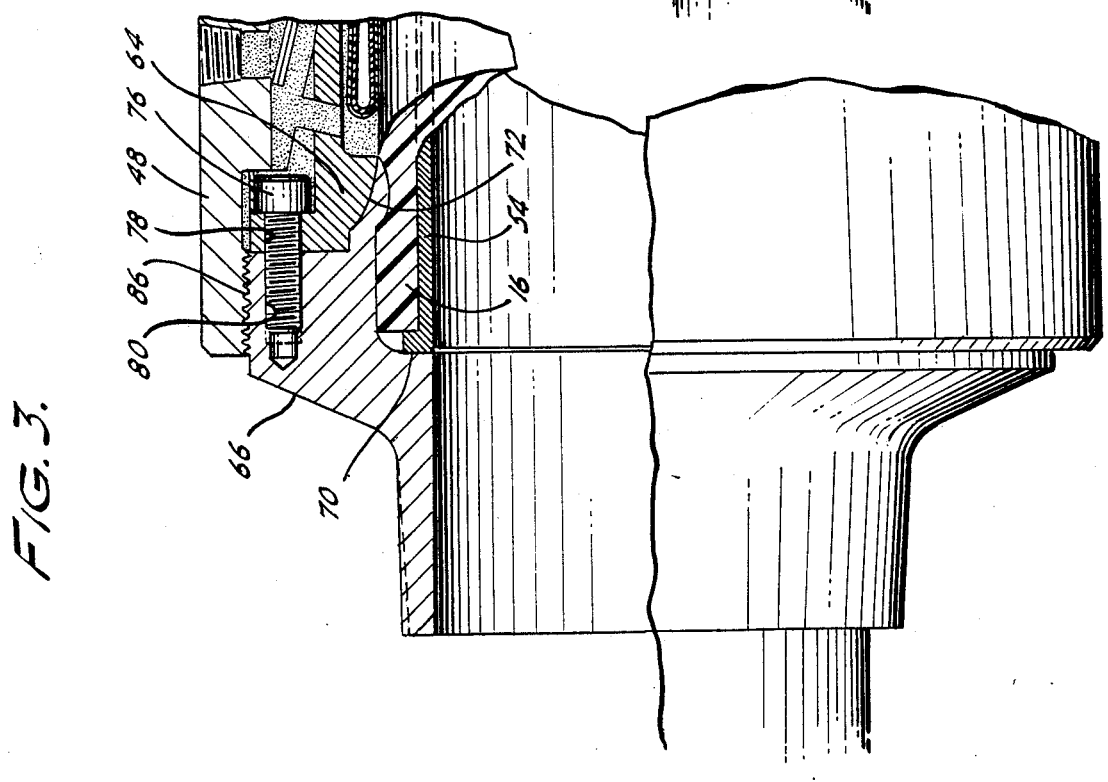

4,890,867

INTEGRAL FERRULE

FIELD OF THE INVENTION

This invention relates to couplings for high pressure, high tensile strength composite flexible pipe, and specifically an integral ferrule contained within the coupling to create an effective seal against leaking fluids.

Considerable efforts have been taken to design and construct pipe capable of withstanding a vast array of different stresses and performing in differing situations and environments. For example, high internal stresses may be created when liquids are pumped through a pipe over long distances. This necessitates a pipe with a high burst strength. A pipe may be subjected to high tensile or longitudinal loads which calls for a high tensile strength. Also, a pipe may need to be flexible or resistant to external harm such as cutting or abrasion.

Recently, pipes have been developed that measure up to these great demands. For example, when naval forces are landing men and material from ships, large quantities of water and fuel are needed. One safe way to transport these necessities is by pipe. Because of the distances involved, typically 3 to 5 miles, large pressures are required to pump the desired liquid to its destination. Since the pipe will be traversing from a ship to land, the pipe should be easily handled. It is highly desirable to have a coupling that can quickly and easily be assembled on the pipe for fast and low cost deployment, because of the criticality of time limitations. It is often necessary for a coupling for such a pipe and such use to be installed in 24 hours or less, which has heretofore been extremely difficult.

However, if the pipe is to be of any use, the coupling or termination point of that pipe must also be capable of at least the same performance. We have found that a primary problem in finding a suitable coupling is preventing the leakage of the contents of the pipe which are being pumped therethrough under pressures as high as 3,000 psi or more. In such high pressure situations as this, the seal must be effected without damaging the pipe.

Another major problem has been in the tolerances required to effect a leak-proof seal. Because traditional ferrule apparatus has such limited deforming capabilities, pipe tolerances have had to be extremely close. This is very undesirable when trying to seal large pipes that are subjected to very high internal pressures. This is especially true of continuously extruded pipe which typically contains variations in the outer diameter. Also, in situations where time, tools and manpower are quite limited as mentioned above, it is very difficult to reach a high level of precision and accuracy in a short period of time.

Furthermore, high pressure, high tensile strength pipes typically are made of many layers. Any sealing apparatus or ferrule must work in concert with means to seal or anchor other layers. Once again, it has been found to be very difficult to properly assemble a coupling capable of performing these tasks under conditions when time and resources are limited.

Another important problem found in couplings that seal high pressure pipes, is that in order to effect an adequate seal, the pipe is deformed in such a way that stress points are created. Over time, these stress points become the sites for stress cracks. Eventually the cracks increase in size to the point where the seal leaks or the pipe fails.

A further problem that has been discovered is that potential leaks have several paths in which to travel out of a coupling. The sealing ferrule attempts to seal one path, but one or more other paths are still available. This is undesirable, as it makes the ferrule ineffective if the coupling leaks through an alternate route.

DESCRIPTION OF THE PRIOR ART

With the advent of many new and different types of pipe, various ferrule arrangements have been developed to be contained within couplings.

For example, U.S. Pat. No. 3,498,646 discloses a tube coupling for a tube with an external thread. A ferule arm is contained within the coupling that deforms the arm into the tube. A nut which encompasses the ferrule arm is tightened so as to effect deformation of the ferrule arm. A tapered portion of the ferrule arm slides along a similarly tapered housing which pushes the ferrule arm into the tube. However, this coupling is limited to a single layered tube. No provisions are made to anchor other layers contained within a multi-layered composite pipe. Also, the ferrule that is utilized has sharp edges. When deformed into the pipe, these edges can create stress points which lead to undesirable stress cracks. Moreover, the ferrule does not reduce the amount of leakage paths. There are several paths in which leaking fluid could escape other than that which is sealed by the ferrule.

U.S. Pat. No. 4,260,182 discloses a compression fitting for a tube. A two-footed ferrule is deformed into the tube by a hollow threaded driving screw. The curved surface of the driving screw deforms one foot, while the curved surface of the fitting body deforms the other foot.

However, one disadvantage lies with the fact that the compression fitting is designed for thin metal tubing and not for composite multi-layered pipe. Another disadvantage is the multiple leakage paths which are possible.

OBJECT OF THE INVENTION

Thus, it is an object of the present invention to provide an integral ferrule of one piece construction that eliminates potential leakage paths and is also capable of preventing leaks in a coupling for a pipe which is subjected to up to 3,000 psi of internal pressure or more and deforms into the objective pipe without creating stress points in the pipe.

It is another important object of the present invention to provide an integral ferrule whose design is a simplification over standard double-foot ferrules and where ferrule arm deformation is actuated by a plurality of bolts so as to eliminate the necessity of utilizing a specially fabricated wrench on one very large nut requiring high torque tightening ability in favor of a standard socket wrench.

Other objects and advantages of the present invention will become apparent to those skilled in the art from the drawings, the detailed description of the preferred embodiment and the appended claims.

SUMMARY OF THE INVENTION

The present invention provides a coupling with an integral ferrule capable of withstanding the demanding requirements presented by high pressure composite pipes by eliminating alternative leakage paths while deforming a ferrule arm in a way so as to not create stress points and obviate the need for very close tolerances. There is a ferrule ring having a portion positioned outwardly of the outer surface of a pipe and having a deformable ferrule arm adjacent to the pipe with the ring being placed over the pipe. A cam ring also located outwardly of the pipe and having a curred surface deforms said ferrule arm into the pipe upon movement of the cam ring against the ferrule ring. A plurality of bolts are provided to effect the deforming movement.

BRIEF DESCRIPTION OF THE DRAWINGS.

FIG. 1 is a front elevational view of one embodiment of the coupling having an integral ferrule for sealing leakage paths in composite pipes.

FIG. 2 represents a front elevational view, partly in section, of the coupling having an integral ferrule shown before the pipe is sealed.

FIG. 3 taken along the 3—3 line of FIG. 1 is also an elevational view, partly in section, of the coupling having an integral ferrule shown after the pipe is sealed.

DETAILED DESCRIPTION OF A PREFERRED EMBODIMENT

Referring to FIG. 1, the exterior of a coupling 12 is shown as it is mounted on composite pipe 10. Coupling lip 14 threads on to another coupling piece known as a "quick disconnect" which is in conventional use and is not shown.

FIG. 2 shows liner sleeve 54 wedged into position inside of pipe core 16 so as to provide a base against sealing pressure. Inner compression sleeve 64 is in position over the end of pipe 10 and ready to be drawn against integral ferrule 66. Housing 48 is slid back out of the way so that bolts 76 may be inserted into inner compression sleeve holes 78. Integral ferrule deformable ferrule arm 72 is in its pre-deformed configuration with straight edges 88 and 90 and tapered straight edge 92.

FIG. 3 shows coupling 12 in its completely assembled form. As in FIG. 2, liner sleeve 54 remains in position inside of pipe core 16. Integral ferrule 66 likewise remains butted against lip 70. However, unlike FIG. 2, FIG. 3 shows inner compression sleeve 64 drawn up against integral ferrule 66. Bolts 76 have been inserted into inner compression sleeve holes 78 and integral ferrule holes 80 and drawn tight. Housing 48 has been threaded onto integral ferrule 66 with threads 86.

We have discovered that the plurality of bolts 76 contributes greatly to the ease of deformation of integral ferrule deformable ferrule arm 72 and the total assembly of coupling 12. Little torque is required to turn bolts 76, and as a consequence, no special wrenches are needed. Simple wrenches using hand power are adequate.

Curved surface 74 of inner compression sleeve 64 has been drawn toward integral ferrule deformable arm 72, and against partially tapered edge 92. Curved surface 72 is in contact with partially tapered edge 92 (from FIG. 2) and has deformed it and integral ferrule deformable ferrule arm 72 into its curved and deformed position into pipe core 16. Pipe core 16 is deformed and a leak-proof seal is created.

The assembly of coupling 12 and the sealing of pipe 10 with integral ferrule 66 can be quickly and easily accomplished. This is extremely important. Previous efforts to create a leak-proof seal with an easily assembled coupling have not been successful. Integral ferrule 66 and especially integral ferrule deformable ferrule arm 72 are preferably composed of one of the many low carbon steels that exhibit high ductility. This, along with partially tapered edge 92, contribute to greater ease of deformation. Also, integral ferrule deformable ferrule arm 72 is relatively thin. The preferred embodiment utilizes an arm with a thickness of about ¼ inch. This too enhances the ease of deformation not found elsewhere.

Integral ferrule 66 provides excellent deformation into pipe core 16 of about 0.1 inches. This is about three times as much deformation as has been previously achieved. This surprising result eliminates the need to machine the diameter of the mating pipe to extremely close tolerances as was required before. Furthermore, integral ferrule deformable ferrule arm 72 can be provided with rounded teeth to provide even greater sealing capabilities. Rounded teeth are preferred over sharp teeth because of the potential for stress cracks that are created in the pipe over time. Stress cracks can result in a leaky seal or in the total failure of the pipe.

Although this invention has been described in connection with specific forms thereof, it will be appreciated that a wide array of equivalents may be substituted for those specific elements shown and described herein without departing from the spirit and scope of this invention as described in the appended claims.

We claim:

1. In a coupling adapted to be mounted and assembled on an end of a deformable pipe and to compress the outer surface of said pipe with respect to the inner surface of said pipe to provide a leak-proof seal, the combination prior to said assembly comprising:
   a ferrule ring having a portion outwardly of the outer surface of said pipe and having a seamless deformable ferrule arm integrally formed from said ring and extending longitudinally therefrom adjacent to the outer surface of said pipe, said arm having an outer surface with only a portion of said outer surface tapering toward the outer surface of the pipe said ring being placed over said pipe such that said ring surrounds an end portion thereof;
   a cam ring also located outwardly of the outer surface of said pipe and longitudinally placed from said deformable ferrule arm, and having a single inner curved surface, said surface being curved with respect to a longitudinally extending axis along said pipe and arranged to deform said ferrule arm in the area of said tapered outer surface into said pipe upon longitudinal movement of said cam ring against said ferrule; said curved surface having an axial extent substantially equal to the axial extent of said tapered outer surface and
   means for effecting such longitudinal movement, thereby deforming said ferrule and compression deforming said pipe and creating said leak-proof seal.

2. A coupling as defined in claim 1, wherein said deformable ferrule arm is low carbon steel.

3. A coupling as defined in claim 1, wherein said deformable ferrule arm contains rounded teeth along said adjacent surface of said pipe so as to more securely grip and seal said coupling.

4. A coupling as defined in claim 1, wherein said curved surface has a radius of curvature of about 1 inch.

5. A coupling as defined in claim 1, wherein said ferrule arm deforms into said deformable pipe about 0.1 inches.

6. A coupling as defined in claim 1, wherein said means for effecting longitudinal movement is a plurality of bolts passing through a portion of said cam ring and into said ferrule ring.

* * * * *